May 15, 1962     J. M. ARTHABER ET AL     3,034,436
OPTICAL FUZE

Filed Feb. 19, 1960                         3 Sheets-Sheet 1

INVENTORS
JOSEF M. ARTHABER
WARD J. MOORE

BY *S. J. Rotondi, A. J. Dupont,*
*F. E. McGee & J. M. Presson*

May 15, 1962   J. M. ARTHABER ET AL   3,034,436
OPTICAL FUZE
Filed Feb. 19, 1960   3 Sheets-Sheet 2

JOSEF M. ARTHABER
WARD J. MOORE
INVENTORS

JOSEF M. ARTHABER
WARD J. MOORE
INVENTORS

United States Patent Office 3,034,436
Patented May 15, 1962

3,034,436
OPTICAL FUZE
Josef M. Arthaber, Greenacres, and Ward J. Moore, Takoma Park, Md., assignors to the United States of America as represented by the Secretary of the Army
Filed Feb. 19, 1960, Ser. No. 10,008
1 Claim. (Cl. 102—70.2)
(Granted under Title 35, U.S. Code (1952), sec. 266)

The invention described herein may be manufactured and used by or for the Government purposes without the payment to us of any royalty thereon.

This invention relates to ordnance fuzes in general, and more specifically to an optical system for use with an ordnance optical fuze, which system generates conical hollow cylindrical or plane detection patterns.

Ordnance missiles utilize optical systems to initiate detonation of the missile when an enemy plane or missile radiating light energy passes through the detection pattern generated by the system. While conical or plane detection patterns are generally regarded by those in the art as being most desirable, optical lens systems which have hitherto been available are quite complex. The disadvantages of complex optical systems should be patently evident. The more complex an optical system is, the more expensive and less reliable it becomes.

Other optical ssytems in optical fuzes utilize a rotating reflector to generate a rotating detection pattern. Such systems, however, are unable to provide continuous 360 degree coverage about the axis of the optical system and require moving parts which may fail during operation thereof. An example of such a system is disclosed in U.S. Patent No. 2,882,823.

Broadly, therefore, it is an object of this invention to provide an improved optical fuze for use in an ordnance missile.

More specifically, it is an object of this invention to provide an optical system which will generate either hollow conical, hollow cylindrical or plane detection patterns by the use of a stationary conical reflector.

Still another object of this invention is to provide an optical system for use with an ordnance fuze in accordance with the above objects, which system is relatively simple and inexpensive.

According to one embodiment of this invention, a stationary conical reflector and a convex lens are used in combination so that a detection pattern is generated which is either conically shaped or plane, depending upon the apex angle of the reflector. The distance between the stationary reflector and the lens is not critical, and different reflectors can be used in order to produce different detection patterns.

The specific nature of the invention, as well as other objects, uses, and advantages thereof, will clearly appear from the following description and from the accompanying drawing, in which.

Figure 1:
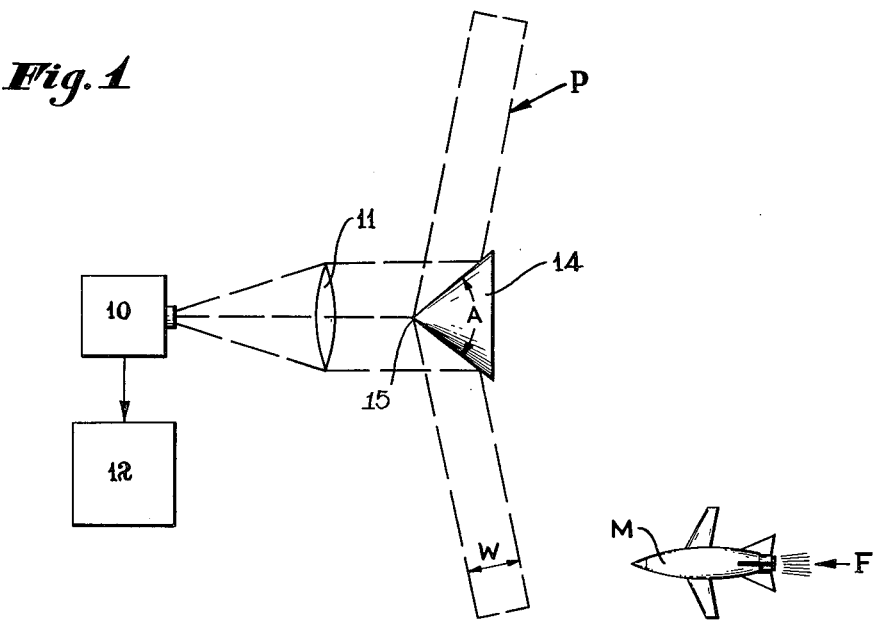
FIG. 1 is a plan view of the optical fuze of this invention and illustrates the cone-shaped detection pattern produced by the optical system.

Referring now to FIG. 1 for a more complete understanding of this invention, there is shown a conventional detector 10 positioned so as to receive light rays from a light focusing means 11, such as a double convex lens or a concave mirror. Detector 10 is connected to fuze 12 of the missile so that when the detector receives a signal of light from a light focusing means 11, the fuze will initiate tht warhead of the missile.

Detector 10 may consist of a photoelectric cell or any suitable photosensitive material which generates an electrical pulse when it receives light energy. Fuze 12 can be housed in any missile (not shown) and may be any conventional fuze capable of initiating or detonating the missile warhead when it receives an electrical pulse from detector 10.

Light focusing means 11 is positioned such that detector 10 receives all the light rays originating inside the detection pattern. Conical reflector 14 consists of a cone, the outer surface of which reflects light. Reflector 14 is positioned so that the apex 15 is adjacent and concentric to the center of light focusing means 11. The axis of reflector 14 coincides with the center of light focusing means 11 and the center of detector 10, as shown. The light rays between focusing means 11 and reflector 14 are substantially parallel. Detector 10, focusing means 11 and reflector 14 form the optical system of the fuze 12.

An optical pattern P is generated by reflector 14 and light focusing means 11. The particular value of apex angle A (FIG. 1) will depend upon the desired pattern shape as will be evident to those skilled in the art. Dimension W is the width of the pattern P so generated, and this dimension is equal to one half the diameter of lens or mirror 11. Any source of light entering the detection pattern P will cause detector 10 to initiate fuze 12. One possible source of light may be the exhaust flame F of the jet engine of a jet plane or missile M.

Figure 2:
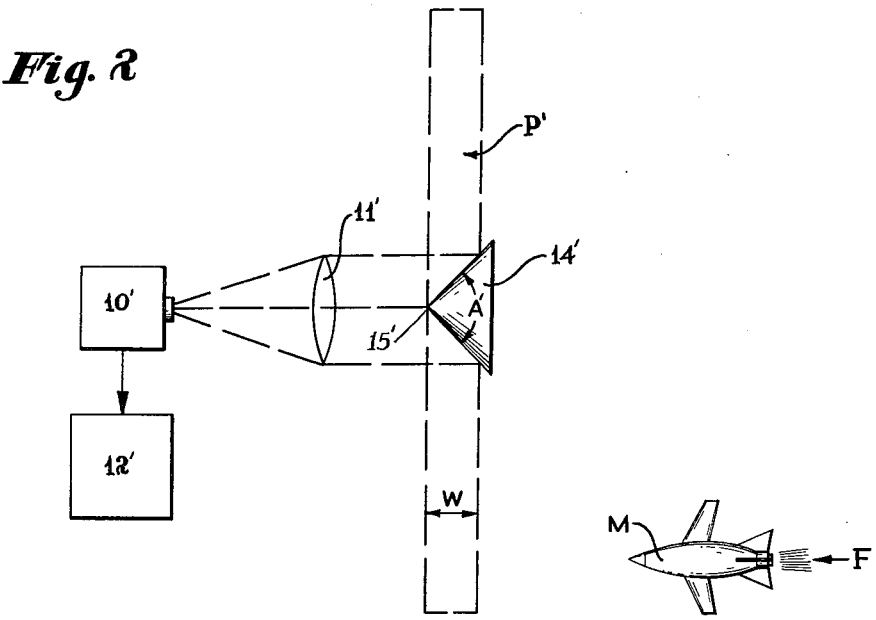
FIG. 2 is a plan view of the optical fuze of this invention and illustrates the circular-plane detection pattern produced by the optical system.
Figure 2A:
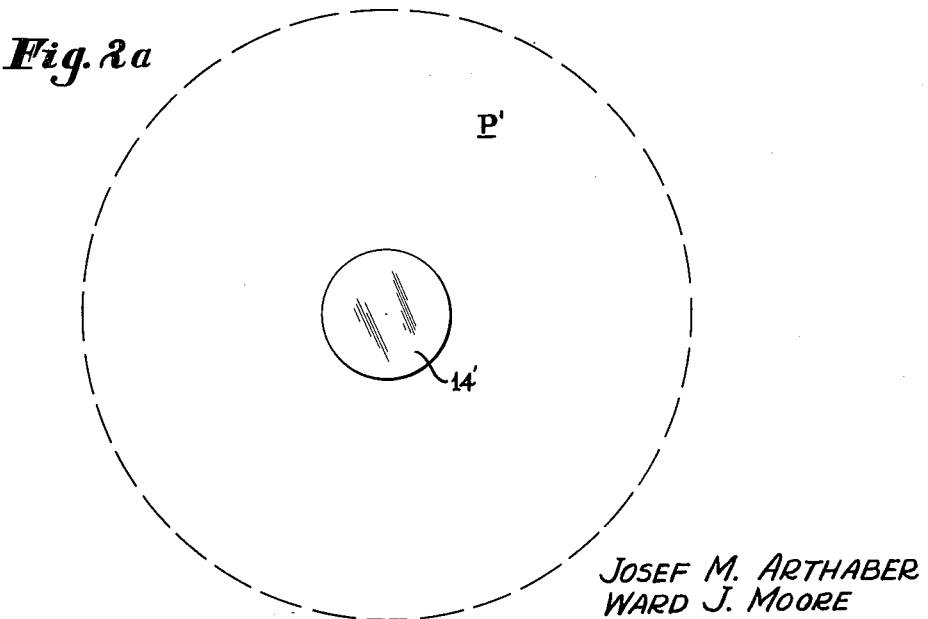
FIG. 2A is an end view of the detection pattern produced by the optical system of FIG. 2.

For a certain critical value of angle A, which is usually close to ninety degrees, the pattern P generated by reflector 14 will be circular. The width of the pattern will be defined by parallel planes, at least within the operating range of the fuze. This pattern is shown in FIGS. 2 and 2A and referred to by letter P¹. Any suitable source of light entering the generated detection pattern P¹ will cause detector 10 to initiate fuze 12.

Figure 1A:
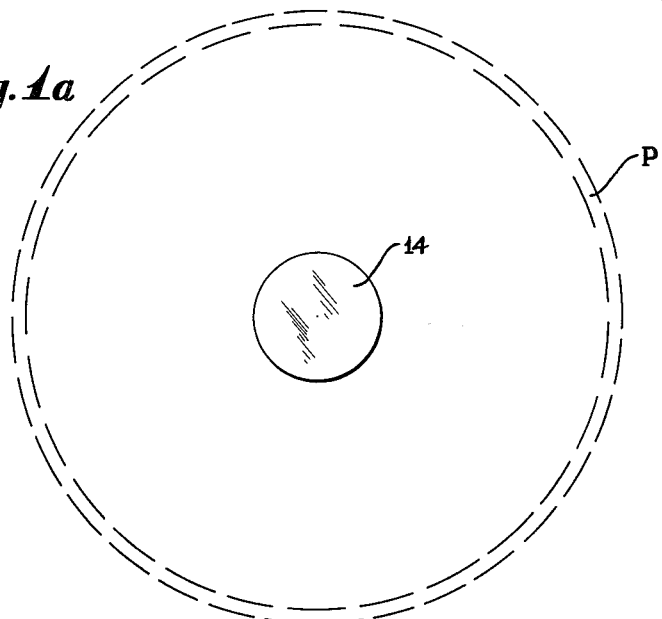
FIG. 1A is an end view of the detection pattern produced by the optical system of FIG. 1.

With reference to FIGS. 1A and 2A, it should be apparent that the diameters of the patterns P and P¹ are finite. Beyond these finite diameters, the pattern diverges slightly and extends to infinity.

Figure 3:
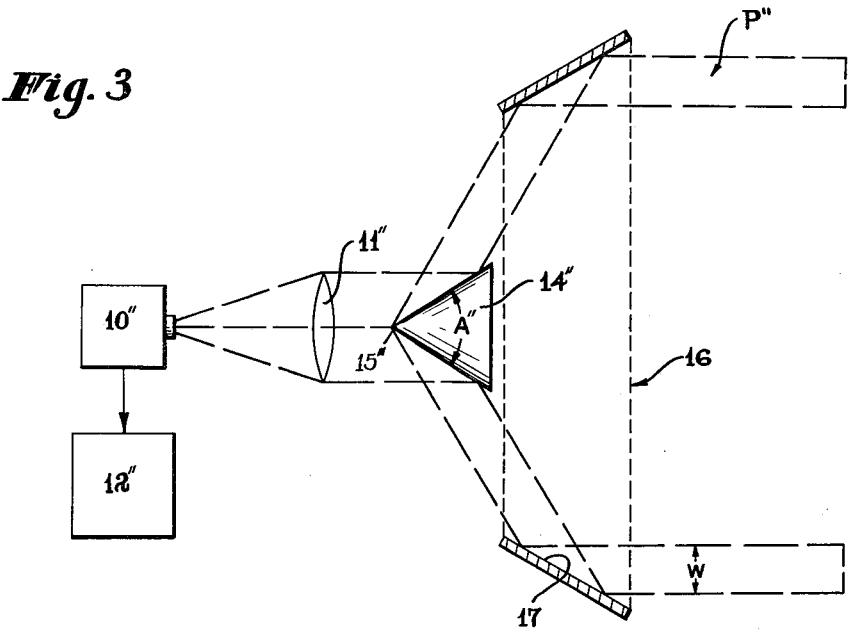
FIG. 3 is a plan view of another embodiment of an optical system for use with the optical fuze of this invention.
Figure 3A:
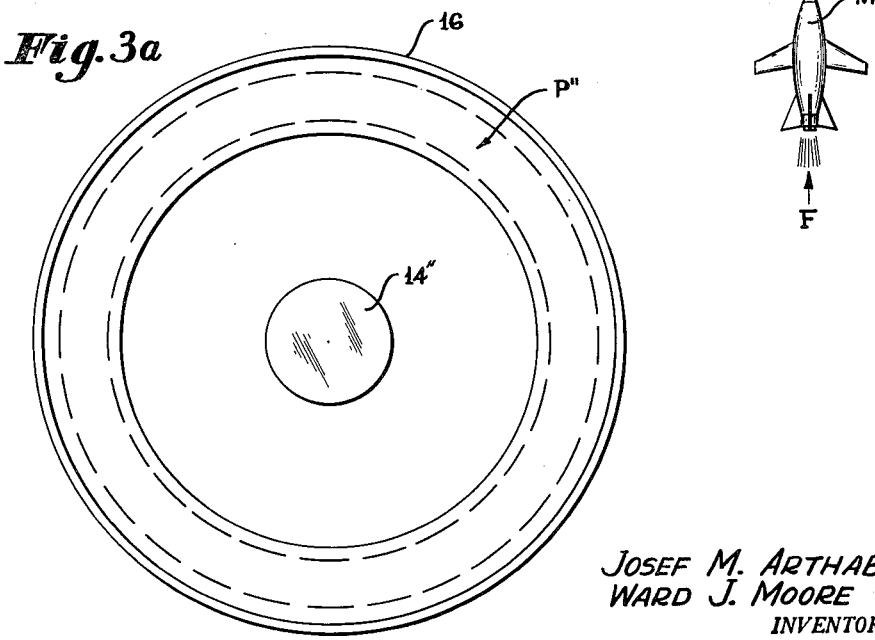
FIG. 3A is an end view of FIG. 3, illustrating the annular detection pattern produced by the optical system shown in that figure.

FIG. 3 illustrates another embodiment of the optical fuze of this invention, wherein like numerals refer to like parts in FIGS. 1 and 2. In this embodiment, the optical system of the fuze includes a hollow cone-shaped ring 16. Ring 16 has an internal cone-shaped light reflecting surface 17 concentrically positioned with respect to the conical surface of reflector 14″ and the center of lens 11″. Surface 17 is substantially parallel to the surface of reflector 14″ and reflects the detection pattern P″ onto the surface of reflector 14″.

Ring 16 provides a detection pattern P″, which is in the shape of a hollow cylinder, the walls of which have a width equal to dimension W (FIG. 3). Dimension W is equal to one-half the diameter of lens 11″. Thus, should missile M pass through the cylindrical pattern P″, ring 16 will reflect the light from exhaust flame F into the surface of reflector 14″, whence it is detected by detector 10, as described above.

Those skilled in the art will also realize that since the light rays are almost parallel between lens 11 and reflector 14, plane or interference filters may be used, if required. It should also be evident that since the distance between lens 11 and reflector 14 is not critical, any reflector can be replaced by another reflector having an apex of some different angular dimension so that any desired cone-shaped pattern can be produced.

It will be apparent that the embodiments shown are only exemplary and that various modifications can be made in construction and arrangement within the scope of the invention as defined in the appended claim.

We claim as our invention:

An optical fuze including means for generating a continuous detection pattern of regular geometrical shape bounded by walls of a predetermined uniform thickness W, said means consisting of a light detector, a conical reflector, and additional reflecting means partially surrounding said conical reflector, said additional reflecting means being in the shape of a right circular conical ring and being coaxially disposed with respect to said conical reflector, and light focusing means interposed between said conical reflector and said detector so that the center of said light focusing means coincides with the axis of said conical reflector and the center of said light detector, said focusing means being positioned a distance from said light detector such that the optical detection region between said focusing means and said conical reflector is defined by parallel boundary lines, the diameter of said light focusing means being equal to 2W.

References Cited in the file of this patent

UNITED STATES PATENTS

| | | |
|---|---|---|
| 2,137,598 | Vos | Nov. 22, 1938 |
| 2,736,250 | Papritz | Feb. 28, 1956 |
| 2,895,049 | Astheimer et al. | July 14, 1959 |